United States Patent [19]

Nishimura et al.

[11] Patent Number: 5,197,564
[45] Date of Patent: Mar. 30, 1993

[54] CRUISE CONTROL APPARATUS FOR A VEHICLE

[75] Inventors: Yukinobu Nishimura; Kazuyori Katayama, both of Himeji, Japan

[73] Assignee: Mitsubishi Denki Kabushiki Kaisha, Tokyo, Japan

[21] Appl. No.: 787,821

[22] Filed: Nov. 5, 1991

[30] Foreign Application Priority Data

Nov. 7, 1990 [JP] Japan .................................. 2-305045
Nov. 7, 1990 [JP] Japan .................................. 2-305046

[51] Int. Cl.⁵ .............................................. B60K 31/04
[52] U.S. Cl. .................................... 180/179; 180/170; 364/426.04
[58] Field of Search ............... 180/175, 176, 177, 178, 180/179, 170; 364/426.04

[56] References Cited

U.S. PATENT DOCUMENTS 5,023,792  6/1991  Shioyama ............................ 180/179
5,024,284  6/1991  Nakano et al. ...................... 180/170

FOREIGN PATENT DOCUMENTS 218239  9/1987  Japan .

Primary Examiner—David M. Mitchell
Attorney, Agent, or Firm—Sughrue, Mion, Zinn, Macpeak and Seas

[57] ABSTRACT

A cruise control apparatus for a vehicle is effective to prevent hunting in the vehicle speed and resultant shocks which are apt to occur when the vehicle is travelling on a down slope under cruise control. A cruise control unit is adapted to be actuated by a driver of the vehicle for automatically controlling the opening degree of a throttle valve so that the speed of the vehicle is maintained at a predetermined target speed. A fuel control unit controls the fuel supply to the vehicle engine such that the fuel supply is cut off when the throttle valve is moved to a fully closed or idling position thereof with the number of revolutions per minute of the engine being equal to or greater than a predetermined value during cruise control. In one aspect, the fuel cut-off is cancelled when the speed of the vehicle decreases below a predetermined lower limit for the target speed during cruise control, and at the same time, the cruise control is temporarily interrupted for a predetermined length of time. In another aspect, the cut-off of the fuel supply by the fuel control unit is inhibited when the vehicle is travelling under cruise control.

2 Claims, 5 Drawing Sheets

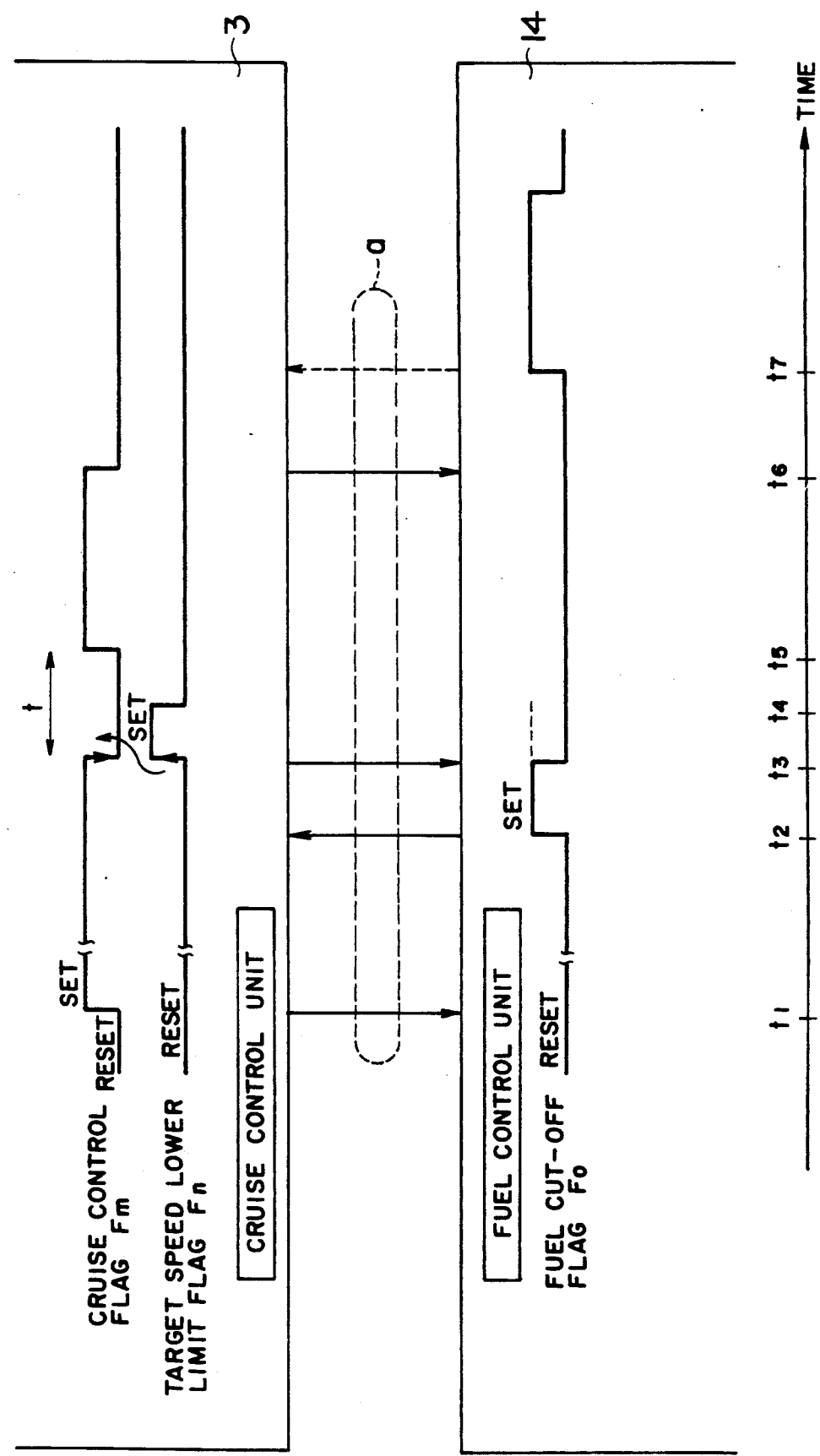

CRUISE CONTROL APPARATUS FOR A VEHICLE

BACKGROUND OF THE INVENTION

The present invention relates to a cruise control apparatus for a vehicle which serves to automatically maintain the speed of the vehicle at a constant target level by properly controlling the opening degree of a throttle valve under the action of a motor or the like.

Japanese Patent Laid-Open No. 62-218239 discloses this type of cruise control apparatus in which a drive mechanism is provided for controllably driving a throttle actuator, which is connected with a throttle valve in an intake manifold of an internal combustion engine independently of an accelerator pedal, on the basis of a speed signal representative of the vehicle speed in combination with control signals such as a cruise control set signal, a cruise control reset signal, a cruise control resume signal, etc., to control the speed of a vehicle.

With this type of conventional cruise control apparatus, however, particularly in cases where it is used in combination with a fuel injection system, when the vehicle enters a downhill during travelling at a constant speed under cruise control, as illustrated at (a) in FIG. 3, the throttle actuator controls the throttle valve to move it to a fully closed position (i.e., an idling position) in order to suppress the vehicle speed, as illustrated by a solid line at (c) in FIG. 3. On this occasion, if the fuel injection system operates to cut off the fuel supply, the vehicle speed abruptly decreases. Accordingly, the throttle valve is then controlled to open so that it moves from the idling position and stops the fuel cut-off. Accordingly, the amount of intake air sucked into the engine increases suddenly, so there develops an abrupt change in the output torque of the engine, as shown by a solid line at (d) in FIG. 3, thus giving rise to a great shock. Subsequently when the vehicle speed increases to exceed a target value, similar events recur. As a result, the vehicle speed is subject to hunting in a cycle of 5 to 6 seconds which is undesirable and very unpleasant to the passengers in the vehicle.

SUMMARY OF THE INVENTION

Accordingly, the present invention is aimed at overcoming the above-noted problems encountered with the conventional cruise control apparatus.

An object of the invention is to provide a novel and improved cruise control apparatus for a vehicle which is effective to prevent hunting in the vehicle and resultant shocks which are apt to occur when the vehicle is travelling on a down slope under cruise control.

In order to achieve the above object, the present invention provides a cruise control apparatus for a vehicle comprising: cruise control means adapted to be actuated by a driver of the vehicle for automatically controlling the opening degree of a throttle valve so that the speed of the vehicle is maintained at a predetermined target speed; and fuel control means for controlling fuel supply to the vehicle engine such that the fuel supply is cut off when the throttle valve is moved to a fully closed position thereof with the number of revolutions per minute of the engine being equal to or greater than a predetermined value during cruise control.

According to one aspect of the invention, the fuel cut-off is cancelled when the speed of the vehicle decreases below a predetermined lower limit for the target speed during cruise control, and at the same time, the cruise control is temporarily interrupted for a predetermined length of time.

According to another aspect of the invention, the cut-off of the fuel supply by the fuel control means is inhibited when the vehicle is travelling under cruise control.

The above and other objects, features and advantages of the invention will become more readily apparent from the following detailed description of a few preferred embodiments of the invention taken in conjunction with the accompanying drawings.

BRIEF DESCRIPTION OF THE DRAWINGS

FIG. 2 is a timing chart showing timing or operational relation between the operations of a cruise control unit and a fuel control unit of FIG. 1 and various control signals;

DESCRIPTION OF THE PREFERRED EMBODIMENTS

A few preferred embodiments of the present invention will now be described in detail while referring to the accompanying drawings.

Figure 1:
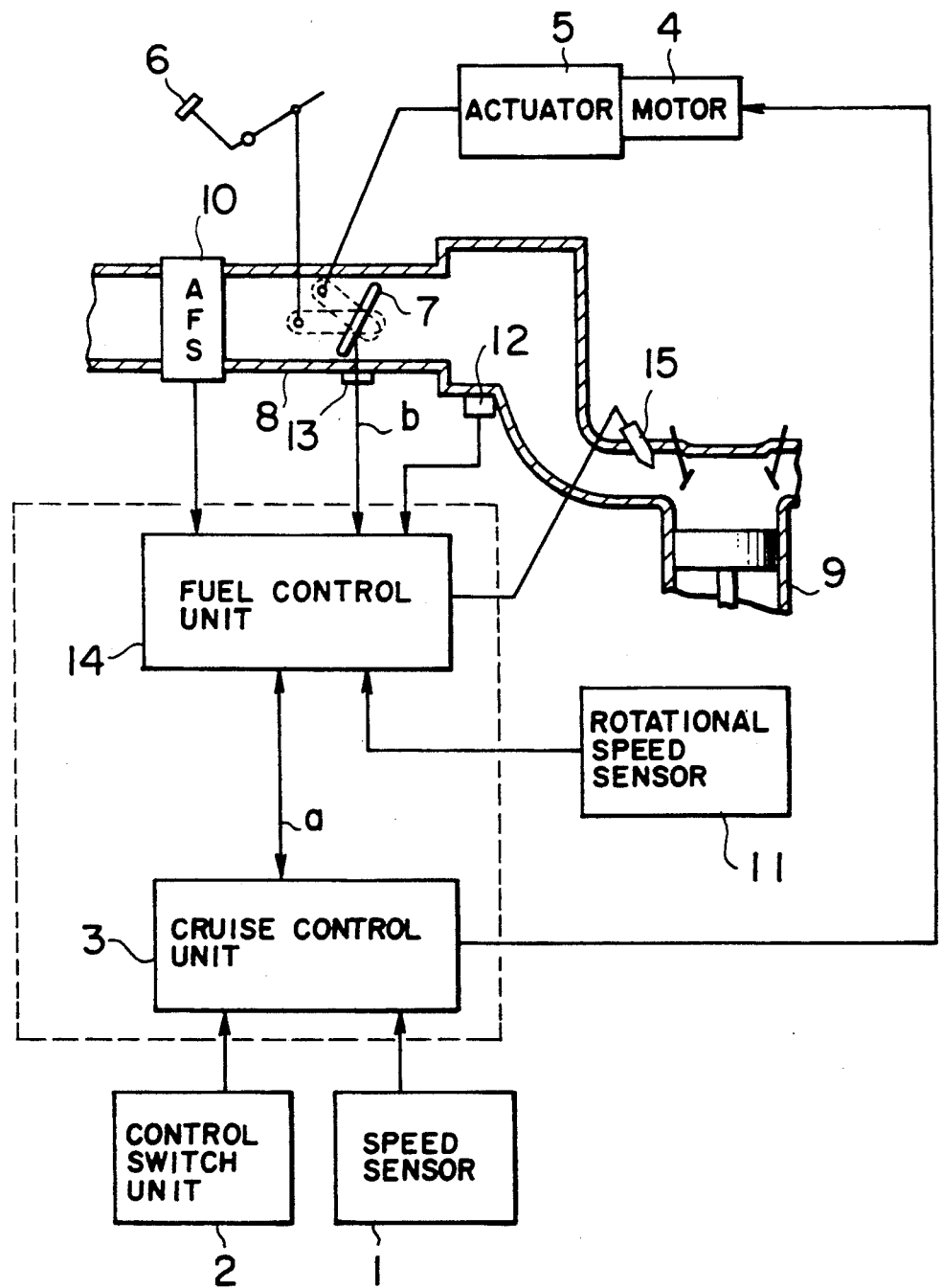
FIG. 1 is a view showing the general arrangement of a cruise control apparatus for a vehicle in accordance with the present invention.
Figure 3A:
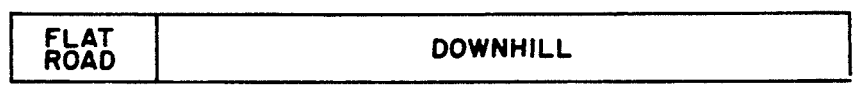
FIG. 3 is a diagrammatic view showing changes in the vehicle speed, throttle opening and engine output torque over time.
Figure 3B:
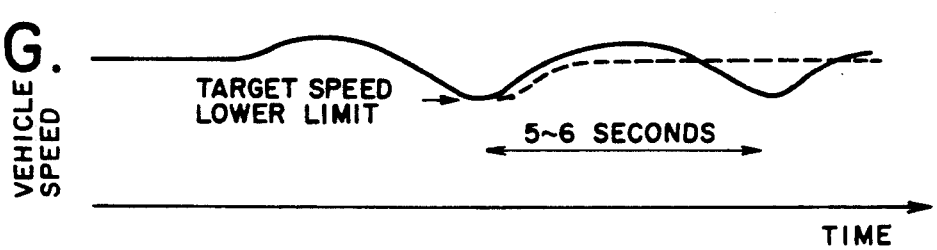
Figure 3C:
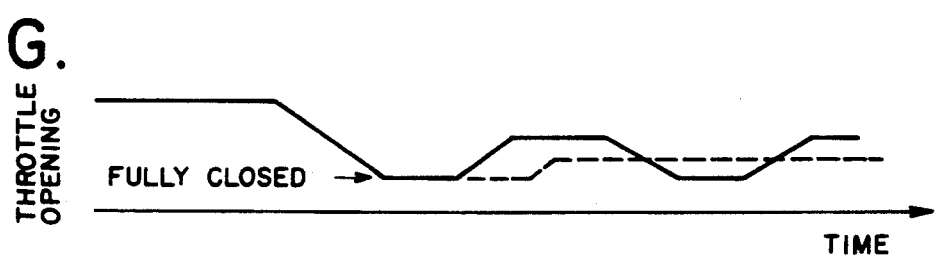
Figure 3D:
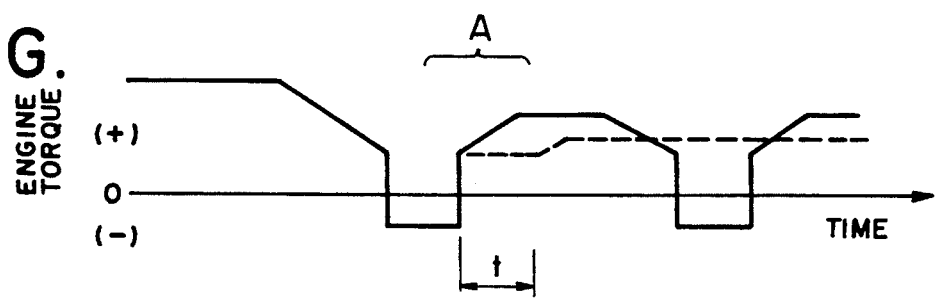

Referring to the drawings and first to FIG. 1, there is illustrated a cruise control apparatus for a vehicle such as an automobile constructed in accordance with the principles of the invention. In this figure, a speed sensor 1 senses the speed of a vehicle and generates a corresponding output signal which is fed to a cruise control unit 3. A control switch unit 2 includes a plurality of control switches such as a set switch for setting a target speed of the vehicle, a reset switch for resetting cruise control, a resume switch for resuming cruise control, a cancellation switch for cancelling cruise control, etc. Thus, the control switch unit 2 generates various control signals such as, for example, a cruise control set signal, a cruise control reset signal, a cruise control resume signal, a cruise control cancellation signal and so on, which are fed to the cruise control unit 3. Based on the control signals from the control switch unit 2 and the vehicle speed signal from the speed sensor 1, the cruise control unit 3 controls a motor 4 which drives an actuator 5 operatively connected with a throttle valve 7 which is disposed in an intake manifold 8 and operatively connected with an accelerator pedal 6 for controlling the flow rate of intake air sucked into engine cylinders 9 (only one is illustrated). Specifically, when the driver turns on the unillustrated set switch in the control switch unit 2 at the instant the speed of the vehicle reaches a desired level, the cruise control unit 3 stores the vehicle speed as sensed by the speed sensor 1 at that time as a target vehicle speed, and then properly controls, based on the target speed and the actual vehicle speed as subsequently sensed, the opening degree of the throttle valve 7 through the motor 4 and the actuator 5 so that a deviation of the actual vehicle speed from the target vehicle speed becomes within a predetermined range. The cruise control can be automatically cancelled at such times as when the driver steps on an unillustrated brake pedal or the accelerator pedal 6.

An air flow sensor (AFS) 10 is disposed in the intake manifold 8 for sensing the flow rate of intake air sucked into the engine cylinders 9 through the intake manifold 8 and generating a corresponding output signal. A rotational speed sensor 11 senses the rotational speed or the number of revolutions per minute of the engine and generates a corresponding output signal. A temperature sensor 12 is mounted on an appropriate portion of the engine such as the intake manifold 8 for sensing the temperature of the engine, e.g., sensing the temperature of an engine coolant, and generating a corresponding output signal. A throttle sensor 13 senses the opening degree of the throttle valve 7 and generates a corresponding output signal. A fuel control unit 14 receives the output signals from the air flow sensor 10, the rotational speed sensor 11, the temperature sensor 12 and the throttle sensor 13, and controls, based on these signals, a fuel injector 15 disposed in the intake manifold 8 at a location downstream of the throttle valve 7, so that a proper amount of fuel is injected from the fuel injector 15 into the intake manifold 8. Specifically, based on the output signal from the air flow sensor 10 representative of the flow rate or amount of intake air sucked into the engine cylinders 9 as well as the output signal from the rotational speed sensor 11 representative of the rpm of the engine, the fuel control unit 14 calculates a basic fuel amount supplied to the engine in the form of a basic pulse width of a fuel injection pulse, and then corrects the basic pulse width by the engine temperature as sensed by the temperature sensor 12 to provide a corrected pulse width whereby the fuel injector 15 is driven to inject an amount of fuel into the intake manifold 8.

In this connection, if the output signal b from the throttle sensor 13 representative of the opening degree of the throttle valve 7 indicates that the throttle valve 7 is in a fully closed position (i.e., an idling position), and if the output signal from the rotational speed sensor 11 indicates that the rotational speed or number of revolutions per minute of the engine is greater than a predetermined value (e.g., 2,000 rpm), the fuel control unit 14 controls the pulse width for driving the fuel injector 15 such that it is made equal to zero, thus stopping the fuel supply from the fuel injector 15 into the intake manifold 8. In addition, a control signal a is transferred between the cruise control unit 3 and the fuel control unit 14 so that when the vehicle speed decreases below a lower limit for the target vehicle speed range due to cut-off of the fuel supply from the fuel injector 15 during cruise control, the fuel control unit 14 stops the fuel cut-off, and at the same time the cruise control unit 3 interrupts the cruise control for a predetermined length of time.

Figure 4:
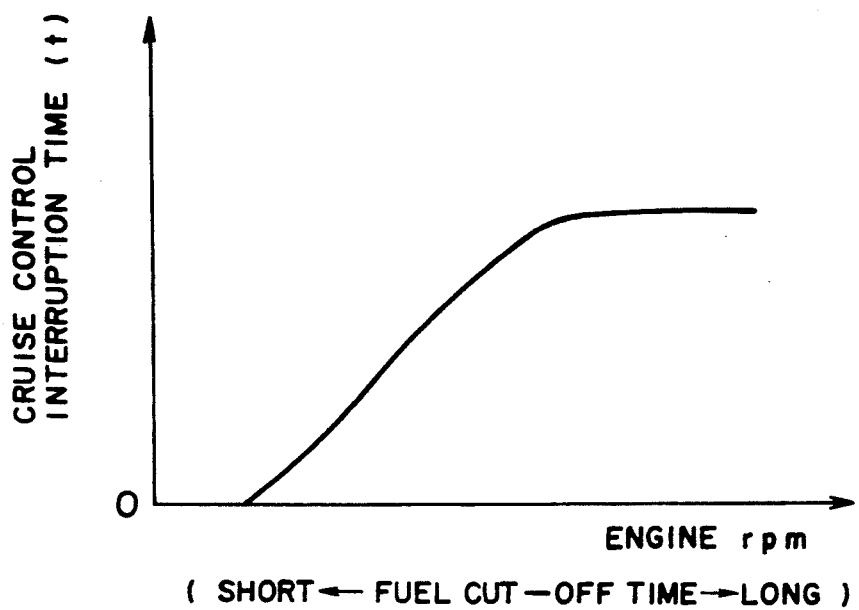
FIG. 4 is a graphical representation showing the relation between the cruise control interrupting time and the rpm of the engine according to the embodiment of FIG. 1.
Figure 5:
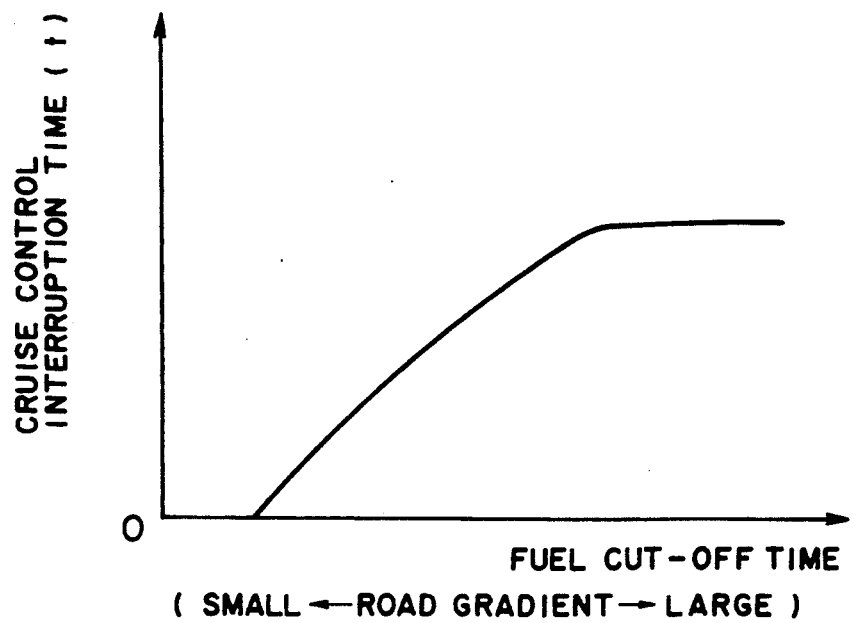
FIG. 5 is a graphical representation showing the relation between the cruise control interrupting time and the fuel cut-off time according to the embodiment of FIG. 1.
Figure 6A:
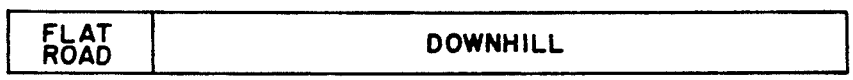
FIG. 6 is a view similar to FIG. 3, but showing the operation of another embodiment.
Figure 6B:
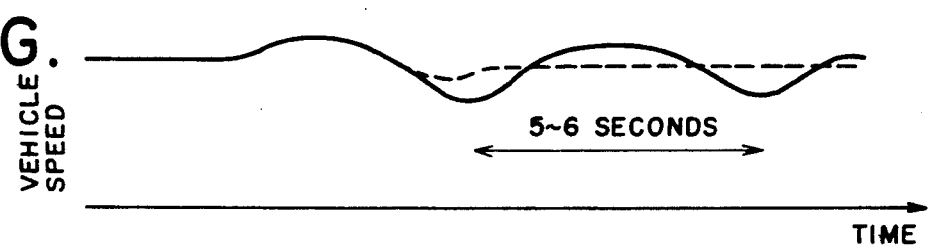
Figure 6C:
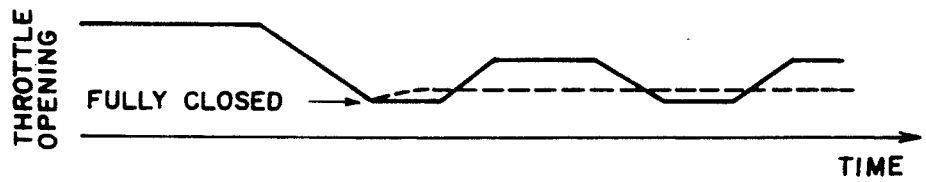
Figure 6D:
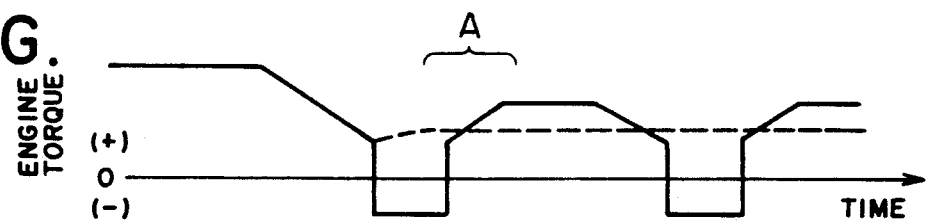

The operation of the above embodiment will now be described in detail while referring to FIG. 2. In this figure, when the driver first operates or turns on the unillustrated set switch in the control switch unit 2 at time $t_1$, the cruise control unit 3 starts cruise control and sets up a cruise control flag $F_m$ which is sent to the fuel control unit 14 so as to inform it of the execution of cruise control. Subsequently when the vehicle under cruise control begins to descend a downward slope at time $t_2$ (e.g., this can be detected by a change in the running resistance of the vehicle), the fuel control unit 14 sets up a fuel cut-off flag $F_0$ which is sent to the cruise control unit 3 to inform it of the execution of fuel supply cut-off control. Thereafter, when the vehicle speed slows down below the lower limit for the target vehicle speed range at time $t_3$, the cruise control unit 3 sets up a target vehicle speed lower limit flag $F_n$, and at the same time it resets the cruise control flag $F_m$ and stops or interrupts cruise control for a predetermined length of time such as t seconds, while instructing the fuel control unit 14 such that it stops the fuel cut-off and resets the fuel cut-off flag $F_0$. Then at time $t_4$ at which the vehicle speed again increases up above the target vehicle speed lower limit, the cruise control unit 3 resets the target vehicle speed lower limit flag $F_n$, and subsequently at time $t_5$, it sets up the cruise control flag $F_m$ and resumes cruise control. When the driver operates an unillustrated cancellation switch in the control switch unit 2 to reset cruise control at time $t_6$, the cruise control unit 3 informs the fuel control unit 14 to that effect. After that, even if the fuel control unit 14 cuts off the fuel supply as at time $t_7$, this need not be informed to the cruise control unit 3. In this connection, the cruise control interruption time t, during which the cruise control is temporarily interrupted or stopped, can be arbitrarily determined using the engine rpm or the fuel cut-off time as a control parameter, as shown by characteristic curves in FIGS. 4 and 5.

In this manner, according to this embodiment, a control signal a is transferred between the cruise control unit 3 and the fuel control unit 14 such that, if the fuel supply is cut off during cruise control to allow the vehicle speed as sensed by the speed sensor 1 to decrease below the target vehicle speed lower limit when the throttle valve 7 is held at its fully closed or idling position and when the engine rotational speed is equal to or greater than a predetermined value such as, for example, 2,000 rpm, the fuel cut-off is immediately stopped, and at the same time the cruise control is temporarily interrupted for a predetermined period of time. As a result, there will be no great change in the engine output torque, which would otherwise be caused after cut-off of the fuel supply during downhill travel under cruise control with the aforementioned conventional cruise control apparatus, as depicted by A at (d) in FIG. 3, to generate a great shock in a periodic manner (e.g., in a cycle of about 5–6 seconds) which leads to hunting of the vehicle, as shown by solid lines at (b) through (d) in FIG. 3. Thus, the apparatus of the invention ensures smooth and stable downhill travel of the vehicle under cruise control without any substantial shock or hunting.

Although in the above embodiment, cruise control is interrupted when the fuel supply is cut off with the engine rpm equal to or greater than the predetermined value (e.g., 2000 rpm), it is possible to control the engine under such a situation in another way. Specifically, in the normal operating condition of the engine without cruise control, the fuel control unit 14 operates to cut off the fuel supply when the throttle valve 7 is at its fully closed or idling position with the engine rpm equal to or greater than a predetermined value, say 2,000 rpm, but it is inhibited from performing fuel cut-off even in the same conditions as described above, when a cruise control signal or flag is fed from the cruise control unit 3 to the fuel control unit 14.

According to this embodiment, a cruise control signal is input to the fuel control unit 14 when the driver turns on the cruise control set switch, so that the fuel control unit 14 is inhibited from cutting off the fuel supply from the fuel injector 15 to the intake manifold 8 even if the fuel cut-off conditions (i.e., the throttle valve 7 is in its fully closed or idling position and the engine rpm is equal to or above 2,000 rpm) are satisfied. Accordingly, a great change in the engine output torque, which would generally be developed immediately after the fuel supply is cut off, particularly during the time when the vehicle is travelling on a downhill under cruise control with the aforesaid conventional cruise control apparatus, as shown by solid lines in FIG. 6, can be avoided in an effective manner, as illustrated by broken lines at (b) through (d) in FIG. 6.

Although in the foregoing description, the cruise control unit 3 and the fuel control unit 14 are shown separately from each other, they can be combined into a single unit.

What is claimed is:

1. A cruise control apparatus for a vehicle with an internal combustion engine comprising:
   cruise control means adapted to be actuated by a driver of the vehicle for automatically controlling the opening degree of a throttle valve so that the speed of the vehicle is maintained at a predetermined target speed;
   fuel control means for controlling fuel supply to the vehicle engine such that the fuel supply is cut off when the throttle valve is moved to a fully closed position thereof with the number of revolutions per minute of the engine being equal to or greater than a predetermined value during cruise control; and
   means for cancelling the fuel cut-off when the speed of the vehicle decreases below a predetermined lower limit for the target speed during cruise control, and at the same time, temporarily interrupting cruise control for a predetermined length of time.

2. A cruise control apparatus according to claim 1, wherein the temporary interruption length of time is predetermined on the basis of one of the number of revolutions per minute of the engine and the fuel cut-off time.

* * * * *